United States Patent
Wang et al.

(10) Patent No.: US 10,944,498 B2
(45) Date of Patent: Mar. 9, 2021

(54) DEVICE AND METHOD FOR MONITORING TWO-STAGE FAULTS OF TDM-PON WITH HIGH PRECISION

(71) Applicant: Taiyuan University of Technology, Taiyuan (CN)

(72) Inventors: Anbang Wang, Taiyuan (CN); Tong Zhao, Taiyuan (CN); Yuncai Wang, Taiyuan (CN); Bingjie Wang, Taiyuan (CN); Peixin He, Taiyuan (CN)

(73) Assignee: Taiyuan University of Technology, Taiyuan (CN)

( * ) Notice: Subject to any disclaimer, the term of this patent is extended or adjusted under 35 U.S.C. 154(b) by 0 days.

(21) Appl. No.: 16/880,177

(22) Filed: May 21, 2020

(65) Prior Publication Data
US 2020/0374026 A1    Nov. 26, 2020

(30) Foreign Application Priority Data
May 26, 2019    (CN) .......................... 201910443079.8

(51) Int. Cl.
     *H04J 14/08*      (2006.01)
     *H04J 14/02*      (2006.01)

(52) U.S. Cl.
     CPC ........ *H04J 14/0246* (2013.01); *H04J 14/025* (2013.01); *H04J 14/08* (2013.01)

(58) Field of Classification Search
     CPC .............................. H04J 14/0246; H04J 14/08
     See application file for complete search history.

(56) References Cited

U.S. PATENT DOCUMENTS

| | | | | |
|---|---|---|---|---|
| 2011/0206376 A1* | 8/2011 | Gottwald | ............ | H04J 14/0298 398/76 |
| 2015/0270895 A1* | 9/2015 | Fink | .................... | H04J 14/0227 398/16 |
| 2018/0083599 A1* | 3/2018 | Kippenberg | ......... | H03H 9/2431 |

* cited by examiner

*Primary Examiner* — Shi K Li
(74) *Attorney, Agent, or Firm* — Troutman Pepper Hamilton Sanders LLP; Christopher C. Close, Jr.

(57) ABSTRACT

The present invention discloses a device and a method for monitoring two-stage faults of a TDM-PON with high precision. A two-stage TDM-PON system includes an OLT I, a feeder fiber II, a stage-1 1:n optical splitter III, a stage-1 branch fiber IV, a stage-2 1:n optical splitter V, a stage-2 branch fiber VI, and an optical network unit (ONU) VII. A two-stage optical network monitoring system includes a monitoring part on the OLT I side and a monitoring part on the ONU VII side, where the monitoring part on the OLT I side includes a control-end isolator-free semiconductor laser, a control-end coupler, a control-end optical coupling device, a control-end photodetector, an integrated signal acquisition and processing device, and an optical coupling device; and the monitoring part on the ONU VII side is similar to the monitoring part of the OLT I side.

3 Claims, 7 Drawing Sheets

DEVICE AND METHOD FOR MONITORING TWO-STAGE FAULTS OF TDM-PON WITH HIGH PRECISION

CROSS REFERENCE TO RELATED APPLICATIONS

This application claims priority, and benefit under 35 U.S.C. § 119(e) of Chinese Patent Application No. 201910443079.8 filed 26 May 2019. The disclosure of the prior application is hereby incorporated by reference as if fully set forth below.

TECHNICAL FIELD

The present invention relates to the network fault monitoring technologies in fiber optic communications, and specifically, to a device and a method for monitoring two-stage faults of a time division multiplexing passive optical network (TDM-PON) with high precision.

BACKGROUND

With the development of optical communication technologies, the optical access network has been widely deployed for optical signal transmission. Fiber to the x (FTTx, including FTTH, FTTB, FTTC, and FTTN, where H, B, C, and N indicate home, building, control, and node, respectively) is gradually replacing the existing broadband access technology, because it can significantly reduce capital expenditures, achieve long-distance and high-rate transmission, and meet the growing broadband demand of users. In a passive optical network, only passive components exist between the control center (CO) and the optical network unit (ONU), which can effectively reduce the operation and maintenance costs of the optical network. Therefore, the passive optical network has been widely used for optical network construction currently. According to the Alcatel Lucent survey, TDM-PON may become the most promising optical access network system in the next few years. However, in the TDM-PON, an optical line terminal (OLT) sends signals with the same wavelength to a remote node (RN), which then sends the signals to the ONU through a power divider in a broadcasting manner. As a result, all branches have the same signals, making it difficult to implement optical network fault monitoring. This problem restricts optical network fault monitoring, increases the difficulty of optical network operation and maintenance, and indirectly hinders the development of the long-distance and multi-user TDM-PON systems. Therefore, timely and accurate diagnosis of fiber faults in the optical network is critical for ensuring communication and digital services. In recent years, researchers have proposed a variety of monitoring techniques:

(1) Branch feature addition method: Intentionally add a different feature to each branch, such as a length, a wavelength, and a code type, and distinguish the branches by identifying specific features of the branches, so as to determine a faulty branch and locate a fault.

(2) Branch selection method: By adding devices, such as an optical switch and a branch selector, enable a controller in a control center to sequentially select each branch of the optical network for fault monitoring and locating. After all the branches are selected, the monitoring of the entire optical network is completed.

3) Overall analysis method: At the beginning of the optical network construction, test the normal network system to obtain its peak power, average power, optical spectrum, and power spectrum. Compare them with corresponding indicators obtained during the network operation, identify a faulty branch based on the existence of a reflection peak and height changes, and locate the fault based on a position change of the reflection peak, so as to monitor the optical network.

The existing methods have implemented fault monitoring of the TDM-PON. However, the optical access network is gradually evolving into a multi-user and multi-branch network. For example, in a two-stage TDM-PON, a transmission terminal needs to transmit signals to a residential area, the residential area transmits the signals to each building (stage 1), and finally each building distributes the signals to each user terminal (stage 2). According to the existing fault monitoring methods, because light is subject to a large distribution loss when passing through an optical splitter, and power distribution at each stage reduces the optical power stage by stage, only weak detection light is fed back from the optical network monitoring system, making it difficult to carry out large-scale fault monitoring in the two-stage optical network.

In addition, the existing fault monitoring methods depend heavily on an optical time domain reflectometer (OTDR). However, some defects exist when the OTDR is used for fiber fault detection in the TDM-PON. The major causes are as follows:

(1) Structurally, branches in the passive optical network have the same signals. The traditional OTDR uses single pulse light as detection signals. The reflected light and scattered light reflected from each branch are superimposed together, making it difficult to demodulate the OTDR tracking signals from the control center. Without any additional information, it is impossible to identify each branch. Moreover, due to the large number of users, measurement time becomes another issue.

(2) Theoretically, there is a trade-off between the spatial resolution and dynamic range of the OTDR. That is, the OTDR needs sufficiently wide optical pulses to ensure the echo power, but the wide pulse width reduces the spatial resolution. The typical detection pulse width of a traditional pulsed OTDR ranges from 10 ns to 1 us, and the corresponding resolution ranges from 1 m to 100 m. Therefore, to use an OTDR to detect a specific fiber fault position, a length difference between the branches must be greater than the resolution. Due to the large number of users, the length of additional fibers to be deployed will increase significantly, and the costs will also increase. This obviously does not meet the requirements for cost-effective detection technologies.

The chaotic correlation detection method in the prior art (ZL 200810054534.7) can implement distance-independent high-precision fault detection, but it still has the following problems:

1. This solution is only suitable for fault detection of a single fiber and cannot identify the branches with same signal, so it is not suitable for the TDM-PON.

2. A dynamic range of detection depends on the sensitivity of a photodetector receiving the detection light. The sensitivity of photodetectors made in the prior art is generally −50 dBm, and monitoring echoes with lower power cannot be detected (for example, in two 64-branch two-stage networks, detection light encounters a loss of 72 dB just at a power divider).

Furthermore, more and more optical access networks are no longer limited to a simple TDM-PON structure, but become more complex with multiple branches to cover more users. The existing methods are difficult to monitor the two-stage TDM-PON, mainly because they cannot identify multiple branches and accurately locate faults.

Therefore, for the two-stage TDM-PON, it is necessary to develop a monitoring technology that features high precision, long distance monitoring, and simple structure and can implement real-time monitoring at the control end to accurately identify branches and locate faults without affecting transmission signals.

SUMMARY

To resolve the fault locating problems of a two-stage TDM-PON such as poor timeliness and accuracy, low resolution, and short monitoring distance, the present invention provides a device and a method for monitoring two-stage faults of a TDM-PON with high precision.

The present invention is implemented through the following technical solution: A device for monitoring two-stage faults of a TDM-PON with high precision includes a two-stage TDM-PON system and a two-stage optical network monitoring system. The two-stage TDM-PON system includes an OLT I, a feeder fiber II, a stage-1 1:n optical splitter III, a stage-1 branch fiber IV, a stage-2 1:n optical splitter V, a stage-2 branch fiber VI, and an optical network unit (ONU) VII, where the OLT I is connected to a common port of the stage-1 1:n optical splitter III through the feeder fiber II, n optical splitting ports of the stage-1 1:n optical splitter III are connected to n stage-2 1:n optical splitters V through n stage-1 branch fibers IV, and n optical splitting ports of the stage-2 1:n optical splitter V are in one-to-one connection with n ONUs VII through n stage-2 branch fibers VI. The two-stage optical network monitoring system includes a control-end isolator-free semiconductor laser, a control-end coupler, a control-end optical coupling device, a control-end photodetector, an integrated signal acquisition and processing device, and an optical coupling device, where the control-end isolator-free semiconductor laser is connected to the control-end coupler; a large-coupling-ratio output end of the control-end coupler is connected to an input end of the control-end optical coupling device, and a small-coupling-ratio output end of the control-end coupler is connected to an input end of the control-end photodetector; the control-end optical coupling device is installed on the feeder fiber II; an output end of the control-end photodetector is connected to an input end of the integrated signal acquisition and processing device; the control-end isolator-free semiconductor laser, the control-end coupler, the control-end optical coupling device, the control-end photodetector, and the integrated signal acquisition and processing device are all located on the OLT I side; and n optical coupling devices are installed on n stage-2 branch fibers VI, and the n optical coupling devices are located on the side of the n ONUs VII. The two-stage optical network monitoring system further includes n stage-3 1:n optical splitters, n user-end isolator-free semiconductor lasers, n user-end couplers, n user-end photodetectors, and n user-end signal acquisition and processing devices, where each user-end isolator-free semiconductor laser is connected to a corresponding user-end coupler; a large-coupling-ratio output end of the user-end coupler is connected to a common port of the stage-3 1:n optical splitter through a fiber, and n optical splitting ports of each stage-3 1:n optical splitter are connected to the n optical coupling devices through fibers; a small-coupling-ratio output end of the user-end coupler is connected to an input end of the user-end photodetector; the user-end photodetector is connected to the user-end signal acquisition and processing device; a distance between the user-end isolator-free semiconductor laser and the control-end isolator-free semiconductor laser varies in each branch, and a minimum difference between adjacent distances is greater than a detection accuracy, ensuring that correlation curves in different clusters do not overlap and that correlation curves in each cluster does not overlap.

The present invention mainly includes two parts: the two-stage TDM-PON system and the two-stage optical network monitoring system. The OLT I and the ONU VII send information to each other through the feeder fiber II, the stage-1 1:n optical splitter III, the stage-1 branch fiber IV, the stage-2 1:n optical splitter V, and the stage-2 branch fiber VI. On the basis of information transmission, the two-stage optical network monitoring system is added for fault monitoring. The laser generates chaotic laser under the disturbance of light injection. The integrated signal acquisition processing device performs autocorrelation processing on the collected signal to generate an autocorrelation curve. Due to the delay, there are side lobes in the autocorrelation curve, and a position of the side lobe is related to the position between two lasers. Therefore, a position of a fault can be analyzed according to the position of the side lobe. The two-stage optical network monitoring system mainly includes a monitoring part on the OLT I side and a monitoring part on the ONU VII side. The monitoring part on the OLT I side includes the control-end isolator-free semiconductor laser, the control-end coupler, the control-end optical coupling device, the control-end photodetector, the integrated signal acquisition and processing device, and the optical coupling device. The monitoring part on the ONU VII side includes n stage-3 1:n optical splitters, n user-end isolator-free semiconductor lasers, n user-end couplers, n user-end photodetectors, and n user-end signal acquisition and processing devices. The control-end isolator-free semiconductor laser emits a laser to the control-end coupler, the large-coupling-ratio output end transmits the laser to the stage-1 1:n optical splitter III through the control-end optical coupling device and the feeder fiber II, and the laser is then transmitted to the n stage-2 1:n optical splitters V through n stage-1 branch fibers IV, then to the optical coupling device through the respective stage-2 branch fibers VI, to the stage-3 1:n optical splitter through a fiber, to the user-end coupler through a fiber, and finally to the user-end isolator-free semiconductor laser. After that, the laser generates chaotic laser under the disturbance of light injection of the control-end isolator-free semiconductor laser. The user-end isolator-free semiconductor laser transmits the laser back to the control-end isolator-free semiconductor laser in the same path. Under the disturbance of mutual injection, the two lasers generate chaotic laser separately, and the two lasers can communicate with each other. According to the previous research (IEEE PHOTONICE TECHNOLOGYLETTERS. Vol 23. No 12. pp 759-761, 2011), the autocorrelation curve of the chaotic laser generated by the isolator-free semiconductor laser under the disturbance of light injection has side lobes, and the side lobes are related to the distance between the two lasers. The small-coupling-ratio output end of the control-end coupler inputs the chaotic laser into the control-end photodetector. The control-end photodetector converts the optical signal into an electrical signal, and inputs it to the integrated signal acquisition and processing device to collect a nonlinear dynamic output signal to perform auto-correlation calculation. A fault position is determined based on the status of the side lobes in the correlation curve. Therefore, a distance between the user-end isolator-free semiconductor laser and the control-end isolator-free semiconductor laser varies in each branch, and a minimum difference between adjacent distances is greater than the detection accuracy, ensuring that correlation curves of different clusters do not overlap (a height of a reflection peak in the autocorrelation curve is related to the intensity of the injected light). Because the side lobes are related to the distance between the two lasers, faults can be determined accordingly. If a fault exists in the optical network transmission line (IEEE Photonics Journal. Vol 7. No 6. pp., 2015), a fault point replaces the corresponding user-end isolator-free semiconductor laser to form a feedback point, and the detection light reaching the feedback point returns to the control-end isolator-free semiconductor laser in the same way, so that the control-end isolator-free semiconductor laser generates a nonlinear dynamic output signal. There are also side lobes in the autocorrelation curve generated by the user-end isolator-free semiconductor laser under the disturbance of light injection. The fault position is determined according to correlation peaks in the autocorrelation curve. Faults may occur anywhere in the entire network. Therefore, analysis must be made based on actual situations, which is described below.

A method for monitoring two-stage faults of a TDM-PON with high precision includes the following steps:

1) After the two-stage TDM-PON system and the two-stage optical network monitoring system are deployed, perform the following steps:

1.1) The control-end isolator-free semiconductor laser emits a laser with a wavelength different from that of a communication signal; the emitted laser passes through the large-coupling-ratio output end of the control-end coupler, and then is coupled into the feeder fiber II through the control-end optical coupling device, and split into the n stage-1 branch fibers IV through the stage-1 1:n optical splitter III; the lasers are transmitted into the n stage-2 1:n optical splitters V through the n stage-1 branch fibers IV, and detection light is transmitted from the optical splitting ports of each stage-2 1:n optical splitter V to the n optical coupling devices through the n stage-2 branch fibers VI, coupled into the stage-3 1:n optical splitter, transmitted to the user-end coupler through a fiber, and then transmitted to the user-end isolator-free semiconductor laser. The user-end isolator-free semiconductor laser generates a chaotic laser under the disturbance of optical injection of the control-end isolator-free semiconductor laser. Each user-end isolator-free semiconductor laser emits a laser with a wavelength different from that of a communication signal. The emitted laser is output from the large-coupling-ratio output end of the user-end coupler, transmitted to the stage-3 1:n optical splitter through a fiber, split into the n optical coupling devices through n fibers, coupled to the stage-2 1:n optical splitters V through the n stage-2 branch fibers VI, coupled to the stage-1 1:n optical splitters III through the stage-1 branch fibers IV, transmitted to the control-end optical coupling device through a fiber, then to the control-end coupler, and finally to the control-end isolator-free semiconductor laser. The control-end isolator-free semiconductor laser generates a chaotic laser under the disturbance of optical injection of the user-end isolator-free semiconductor laser. The two lasers generate chaotic lasers under the disturbance of mutual injection, and the two lasers can communicate with each other. At the control end, the control-end coupler inputs the chaotic laser generated by the control-end isolator-free semiconductor laser to the control-end photodetector through the small-coupling-ratio output end, and the control-end photodetector converts the optical signal into an electrical signal, and then inputs the electrical signal to the acquisition and processing device, so that the acquisition and processing device collects nonlinear signals dynamically output by the control-end isolator-free semiconductor laser, performs autocorrelation calculation, and determines an optical network fault based on the status of the side lobes in an autocorrelation curve. At the user end, the user-end coupler inputs the chaotic laser generated by the user-end isolator-free semiconductor laser to the user-end photodetector through the small-coupling-ratio output end, and the user-end photodetector converts the optical signal into an electrical signal, and inputs the electrical signal into the user-end signal acquisition and processing device, so that the integrated signal acquisition and processing device collects nonlinear signals dynamically output by the user-end isolator-free semiconductor laser, and performs autocorrelation calculation, to further help the control-end isolator-free semiconductor laser to determine an optical network fault based on the status of correlation peaks in an autocorrelation curve.

1.2) the integrated signal acquisition and processing device and the user-end signal acquisition and processing device perform autocorrelation calculation on the received electrical signals and obtain the autocorrelation curves.

1.3) After the fault monitoring system is set up, perform a complete measurement on the optical network system when the optical network is in normal communication, where there are multiple correlation peaks at different positions except the position of 0 m in the autocorrelation curve; and due to optical injection of the two lasers and different lengths of the stage-2 branch fibers VI under each stage-1 branch fiber IV, the correlation peaks appear cluster by cluster, where each cluster corresponds to each stage-1 branch fiber, and each correlation peak within a cluster corresponds to each stage-2 branch fiber; mark the correlation peak in the cluster corresponding to each stage-1 branch fiber by turning off a corresponding user-end isolator-free semiconductor laser, mark the correlation peak corresponding to each stage-2 branch fiber of the optical network system by disconnecting a corresponding stage-2 branch fiber, and then start monitoring while the optical network system is running; and perform a test on the optical network in real time, and compare a test result with the first marking result to determine a running status of the optical network. A generated reference curve is shown in FIG. 1.

2) After the two-stage TDM-PON system starts running, continuously compare the autocorrelation curves obtained in steps 1.2) and 1.3), and determine a specific position of the fault according to different phenomena:

(1) If the correlation peaks of all branches in the autocorrelation curve of the control-end isolator-free semiconductor laser obtained by the test become very small or disappear, and a new correlation peak appears before the first cluster of correlation peaks, it indicates that the fault hinders the communication of the entire optical network, and the fault occurs in the feeder fiber II, as shown by fault 1 in FIG. 2 and FIG. 4; the corresponding fault point as a reflection device has an optical feedback effect on the control-end isolator-free semiconductor laser, and correspondingly, the new peak appears in the autocorrelation curve, and a position of the reflection peak corresponds to the fault position.

(2) If correlation peaks in only one cluster of the autocorrelation curve of the control-end isolator-free semiconductor laser obtained by the test becomes very small or disappears, and a new correlation peak appears at another position, it indicates that only one stage-1 branch fiber is blocked, and the fault occurs in the stage-1 branch fiber IV, as shown by fault 2 in FIG. 2 and FIG. 5; due to the optical feedback effect, the new reflection peak appears at another position in the autocorrelation curve, and the position of the reflection peak corresponds to the fault position.

(3) If correlation peaks in only one cluster of the autocorrelation curve of the control-end isolator-free semiconductor laser obtained by the test becomes very small or disappears, and no new correlation peak appears at another position, it indicates that only one stage-1 branch fiber is blocked, and the fault occurs in the fiber of the monitoring system, as shown by fault 5 in FIG. 2 and FIG. 8; in this case, the fault point is located based on the autocorrelation curve obtained by the user-end signal acquisition and processing device 11, as shown in FIG. 12 (for details, see IEEE Photonics Journal. Vol 7. No 6. pp., 2015).

(4) If a marked correlation peak in one cluster of the autocorrelation curve of the control-end isolator-free semiconductor laser obtained by the test becomes very small or disappears, and no new peak appears in another position (because light experiences a loss when passing through fibers, and light reflected from a fault point at a stage-2 branch fiber is very small, it is difficult to generate an obvious peak value), the fault occurs in the stage-2 branch fiber VI or a monitoring system of this branch. If the network communication is normal, the fault occurs in the monitoring system, as shown by fault 3 in FIG. 2 and FIG. 6; if the network communication is abnormal, the fault occurs in the stage-2 branch fiber VI, as shown by fault 4 in FIG. 2 and FIG. 7. In this case, the fault point is located based on the autocorrelation curve obtained by the user-end signal acquisition and processing device, as shown in FIG. 13 (for details, see IEEE Photonics Journal. Vol 7. No 6. pp., 2015). Then, the user-end isolator-free semiconductor laser reports a monitoring result to the control-end isolator-free semiconductor laser through any normal branch under this branch.

(5) If correlation peaks of multiple clusters become very small or disappear, and correlation peaks of the same quantity appear before the first cluster of correlation peaks, faults occur in multiple stage-1 branch fibers IV, as shown in FIG. 9. In this case, the faulty branches are checked against the marked stage-1 branch fibers IV according to positions of the extra peaks.

(6) If only multiple correlation peaks in the same cluster change, as shown in FIG. 10, faults occur in multiple stage-2 branch fibers VI under one stage-1 branch fiber IV. In this case, the faulty branches are checked against the marked branches according to positions of the extra correlation peaks in the autocorrelation curve obtained by the user-end signal acquisition and processing device, as shown in FIG. 14 (for details, see IEEE Photonics Journal. Vol 7. No 6. pp., 2015). Then, the user-end isolator-free semiconductor laser reports a monitoring result to the control-end isolator-free semiconductor laser through any normal branch.

(7) If multiple correlation peaks in different clusters change, as shown in FIG. 11, faults occur in multiple stage-2 branch fibers VI under different stage-1 branch fibers IV. In this case, the faulty branches are checked against the marked branches according to positions of the extra correlation peaks in the autocorrelation curve obtained by the user-end signal acquisition and processing device. Then, the user-end isolator-free semiconductor laser reports a monitoring result to the control-end isolator-free semiconductor laser through any normal branch.

In the present invention, all values of n do not specifically refer to a specific value, and all values of n refer to different values, indicating different quantities of each component in the solution, depending on actual situations.

Compared with the prior art, the present invention has the following beneficial effects: In the device and method for monitoring a two-stage fiber of a TDM-PON provided by the present invention, through optical injection, one laser generates a laser and injects it into the other laser. The chaotic laser of both control-end and user-end lasers are controlled to generate and output by controlling the operating wavelength detuning of the two lasers, injection intensity of the lasers, and pump current of the lasers. Autocorrelation processing is performed on the chaotic lasers, so that side lobes are generated in autocorrelation curves (side lobes are related to a distance between the two lasers). In the present invention, a fiber fault is determined according to the changes in the side lobes. Compared with the prior art, the present invention has the following advantages: (1) The solution can be used to monitor the two-stage TDM-PON. (2) The solution can detect a fault on the OLT I side and accurately locate the fault. The OLT side and the ONU can communicate with each other, so when one branch fails, other branches can upload fault information to the OLT side. (3) The structure is simple. Monitoring of the entire optical network can be implemented simply by adding some components. (4) The solution can also be applied to deployed optical networks. (5) The monitoring system supports both high spatial resolution and long distance. (6) Because the monitoring system supports high spatial resolution, only a short jumper is needed to distinguish between branches, compared with a length marking method in OTDR monitoring. Therefore, this solution is cost-effective and easy to implement. (7) This solution can also monitor and locate multiple fault points (side lobes are related to the distance between the two lasers) because the monitoring system has multiple lasers.

In the figure, a dotted line represents where no image is available.

DETAILED DESCRIPTION

The present invention will be further described below in conjunction with specific examples.

Figure 1:
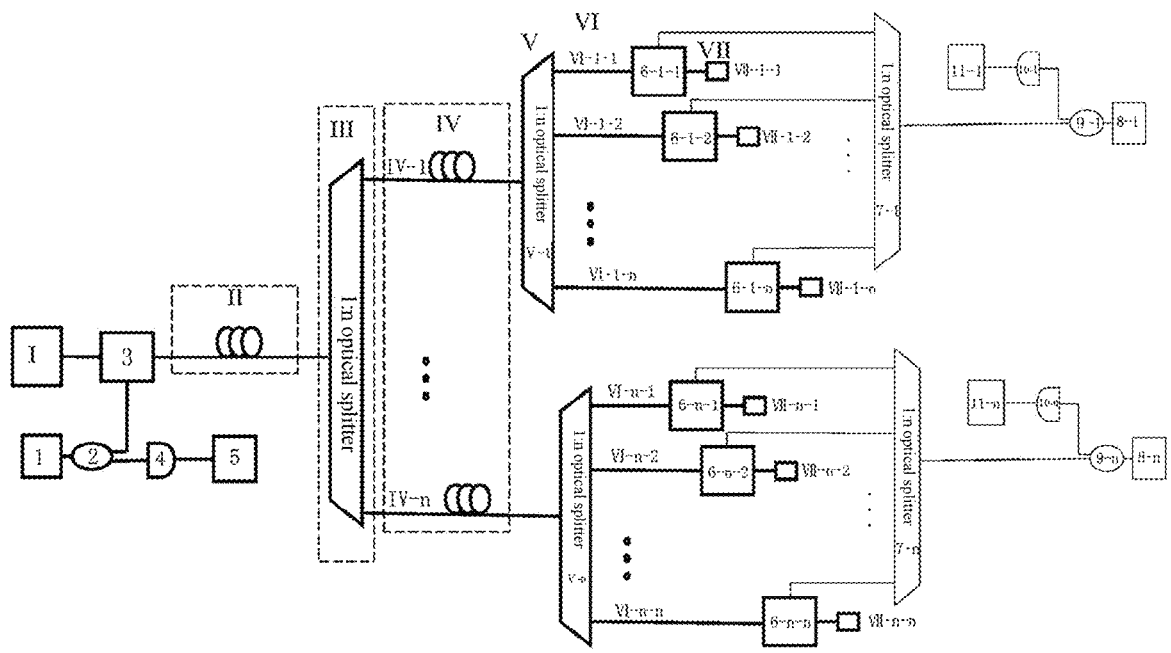
FIG. 1 is a schematic structural diagram of the present invention.

As shown in FIG. 1, a device for monitoring two-stage faults of a TDM-PON includes a two-stage TDM-PON system and a two-stage optical network monitoring system. The two-stage TDM-PON system includes an OLT I, a feeder fiber II, a stage-1 1:n optical splitter III, a stage-1 branch fiber IV, a stage-2 1:n optical splitter V, a stage-2 branch fiber VI, and an ONU VII. The OLT I is connected to a common port of the stage-1 1:n optical splitter III through the feeder fiber II, n optical splitting ports of the stage-1 1:n optical splitter III are connected to n stage-2 1:n optical splitters V through n stage-1 branch fibers IV, and n optical splitting ports of each stage-2 1:n optical splitter V are in one-to-one connection with n ONUs VII through n stage-2 branch fibers VI. The two-stage optical network monitoring system includes a control-end isolator-free semiconductor laser 1, a control-end coupler 2, a control-end optical coupling device 3, a control-end photodetector 4, an integrated signal acquisition and processing device 5, and an optical coupling device 6. The control-end isolator-free semiconductor laser 1 is connected to the control-end coupler 2; a large-coupling-ratio output end of the control-end coupler 2 is connected to an input end of the control-end optical coupling device 3, and a small-coupling-ratio output end of the control-end coupler 2 is connected to an input end of the control-end photodetector 4; the control-end optical coupling device 3 is installed on the feeder fiber II; an output end of the control-end photodetector 4 is connected to an input end of the integrated signal acquisition and processing device 5; the control-end isolator-free semiconductor laser 1, the control-end coupler 2, the control-end optical coupling device 3, the control-end photodetector 4, and the integrated signal acquisition and processing device 5 are all located on the OLT I side; n optical coupling devices 6 are installed on the n stage-2 branch fibers VI, and located on the n ONUs VII. The two-stage optical network monitoring system further includes n stage-3 1:n optical splitters 7, n user-end isolator-free semiconductor lasers 8, n user-end couplers 9, n user-end photodetectors 10, and n user-end signal acquisition and processing devices 11. Each user-end isolator-free semiconductor laser 8 is connected to the corresponding user-end coupler 9; a large-coupling-ratio output end of the user-end coupler 9 is connected to a common port of the stage-3 1:n optical splitter 7 through a fiber, and n optical splitting ports of each stage-3 1:n optical splitter 7 are connected to the n optical coupling devices 6 through fibers; a small-coupling-ratio output end of the user-end coupler 9 is connected to an input end of the user-end photodetector 10, and the user-end photodetector 10 is connected to the user-end signal acquisition and processing device 11; a distance between the user-end isolator-free semiconductor laser and the control-end isolator-free semiconductor laser 1 varies in each branch, and a minimum difference between adjacent distances is greater than detection accuracy, ensuring that correlation curves in different clusters do not overlap and that correlation curves in each cluster do not overlap.

In this example, the control-end isolator-free semiconductor laser 1 and the user-end isolator-free semiconductor laser 8 support a wavelength range of 1600 nm to 1700 nm and an output power of 1 mW to 1 W. A wavelength difference between the two lasers must be within 0.5 nm (a condition for generating chaotic lasers). The control-end coupler 2 and the user-end coupler 9 are optical couplers with a coupling ratio of 80:20 to 99:1. The control-end optical coupling device 3 and the user-end optical coupling device 6 are wavelength division multiplexers or optical couplers with a coupling ratio of 50:50. The control-end photodetector 4 and the user-end photodetector 10 are high-speed photodetectors that can respond to signals with a wavelength ranging from 1600 nm to 1700 nm and have a bandwidth of less than 50 GHz. The integrated signal acquisition and processing device 5 and the user-end signal acquisition and processing device 11 each consist of a single-channel signal acquisition device with a bandwidth of less than 50 GHz and a digital correlator or computer that can perform autocorrelation calculation.

Figure 2:
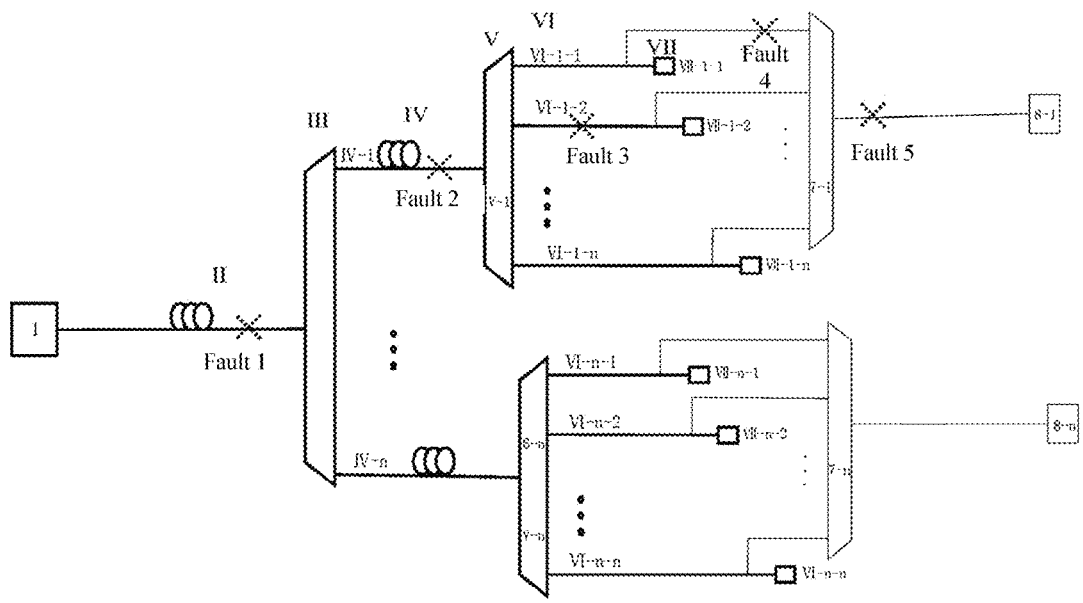
FIG. 2 is a schematic fault diagram according to the present invention.

In this example, there may be different types of faults, as shown in FIG. 2. If distances are the same, a jumper needs to be added at the stage-2 branch fiber VI (without affecting a normal communication part of the optical network) to ensure that distances between fibers are different.

A method for monitoring two-stage faults of a TDM-PON with high precision based on the device for monitoring two-stage faults of a TDM-PON with high precision provided in the foregoing example includes the following steps:

1) After the two-stage TDM-PON system and the two-stage optical network monitoring system are deployed, perform the following steps:

1.1) The control-end isolator-free semiconductor laser 1 emits a laser with a wavelength different from that of a communication signal; the emitted laser passes through the large-coupling-ratio output end of the control-end coupler 2, and then is coupled into the feeder fiber II through the control-end optical coupling device 3, and split into the n stage-1 branch fibers IV through the stage-1 1:n optical splitter III; the lasers are transmitted into the n stage-2 1:n optical splitters V through the n stage-1 branch fibers IV, and detection light is transmitted from the optical splitting ports of each stage-2 1:n optical splitter V to the n optical coupling devices 6 through the n stage-2 branch fibers VI, coupled into the stage-3 1:n optical splitter 7, transmitted to the user-end coupler 9 through a fiber, and then transmitted to the user-end isolator-free semiconductor laser 8. The user-end isolator-free semiconductor laser 8 generates a chaotic laser under the disturbance of optical injection of the control-end isolator-free semiconductor laser 1. Each user-end isolator-free semiconductor laser 8 emits a laser with a wavelength different from that of a communication signal. The emitted laser is output from the large-coupling-ratio output end of the user-end coupler 9, transmitted to the stage-3 1:n optical splitter 7 through a fiber, split into the n optical coupling devices 6 through n fibers, coupled to the stage-2 1:n optical splitters V through the n stage-2 branch fibers VI, coupled to the stage-1 1:n optical splitters III through the stage-1 branch fibers IV, transmitted to the control-end optical coupling device 3 through a fiber, then to the control-end coupler 2, and finally to the control-end isolator-free semiconductor laser 1. The control-end isolator-free semiconductor laser 1 generates a chaotic laser under the disturbance of optical injection of the user-end isolator-free semiconductor laser 8. The two lasers generate chaotic lasers under the disturbance of mutual injection, and the two lasers can communicate with each other. At the control end, the control-end coupler 2 inputs the chaotic laser generated by the control-end isolator-free semiconductor laser 1 to the control-end photodetector 4 through the small-coupling-ratio output end, and the control-end photodetector 4 converts the optical signal into an electrical signal, and then inputs the electrical signal to the acquisition and processing device 5, so that the acquisition and processing device 5 collects nonlinear signals dynamically output by the control-end isolator-free semiconductor laser 1, performs autocorrelation calculation, and determines an optical network fault based on the status of the side lobes in an autocorrelation curve. At the user end, the user-end coupler 9 inputs the chaotic laser generated by the user-end isolator-free semiconductor laser 8 to the user-end photodetector 10 through the small-coupling-ratio output end, and the user-end photodetector 10 converts the optical signal into an electrical signal, and inputs the electrical signal into the user-end signal acquisition and processing device 11, so that the integrated signal acquisition and processing device 11 collects nonlinear signals dynamically output by the user-end isolator-free semiconductor laser 8, and performs autocorrelation calculation, to further help the control-end isolator-free semiconductor laser 1 to determine an optical network fault based on the status of correlation peaks in an autocorrelation curve.

1.2) the integrated signal acquisition and processing device 5 and the user-end signal acquisition and processing device 11 perform autocorrelation calculation on the received electrical signals and obtain the autocorrelation curves.

Figure 3:
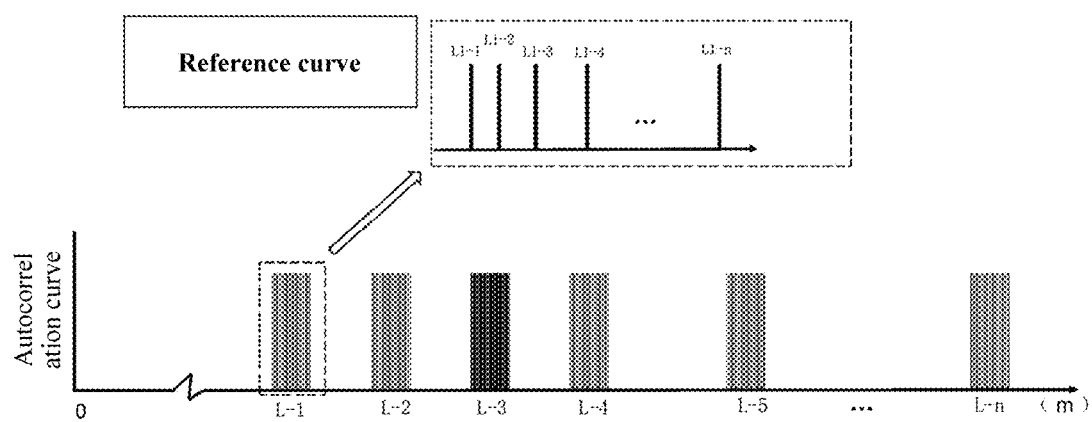
FIG. 3 is an autocorrelation reference curve diagram of a control-end isolator-free semiconductor laser 1.

1.3) After the fault monitoring system is set up, perform a complete measurement on the optical network system when the optical network is in normal communication, where there are multiple correlation peaks at different positions except the position of 0 m in the autocorrelation curve; and due to optical injection of the two lasers and different lengths of the stage-2 branch fibers VI under each stage-1 branch fiber IV, the correlation peaks appear cluster by cluster, where each cluster corresponds to each stage-1 branch fiber, and each correlation peak within a cluster corresponds to each stage-2 branch fiber; mark the correlation peak in the cluster corresponding to each stage-1 branch fiber by turning off a corresponding user-end isolator-free semiconductor laser 8, mark the correlation peak corresponding to each stage-2 branch fiber of the optical network system by disconnecting a corresponding stage-2 branch fiber, and then start monitoring while the optical network system is running; and perform a test on the optical network in real time, and compare a test result with the first marking result to determine a running status of the optical network. FIG. 3 shows the generated reference curve.

Figure 4:
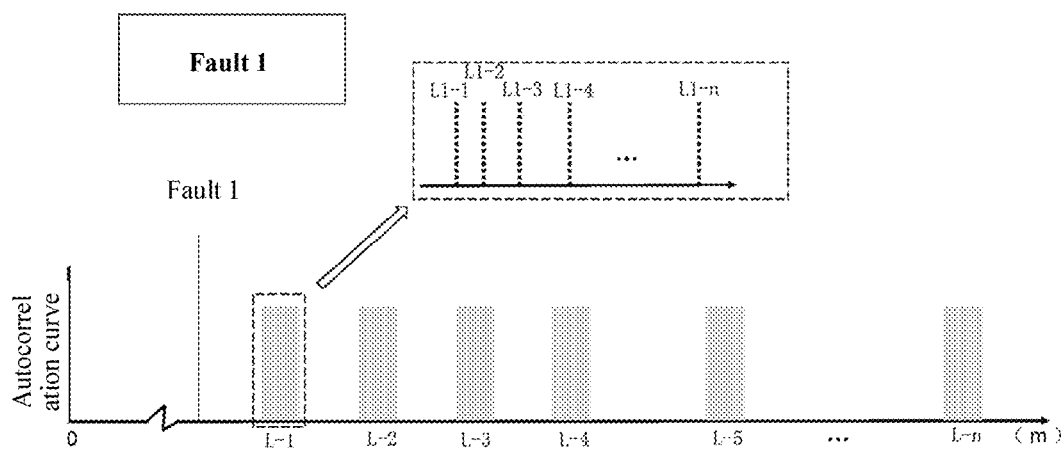
FIG. 4 shows an autocorrelation curve of a control-end isolator-free semiconductor laser 1 when fault 1 in FIG. 2 occurs.

2) After the two-stage TDM-PON system starts running, continuously compare the autocorrelation curves obtained in steps 1.2) and 1.3), and determine a specific position of the fault according to different phenomena:

(1) If the correlation peaks of all branches in the autocorrelation curve of the control-end isolator-free semiconductor laser 1 obtained by the test become very small or disappear, and a new correlation peak appears before the first cluster of correlation peaks, it indicates that the fault hinders the communication of the entire optical network, and the fault occurs in the feeder fiber II, as shown by fault 1 in FIG. 2 and FIG. 4; the corresponding fault point as a reflection device has an optical feedback effect on the control-end isolator-free semiconductor laser 1, and correspondingly, the new peak appears in the autocorrelation curve, and a position of the reflection peak corresponds to the fault position.

Figure 5:
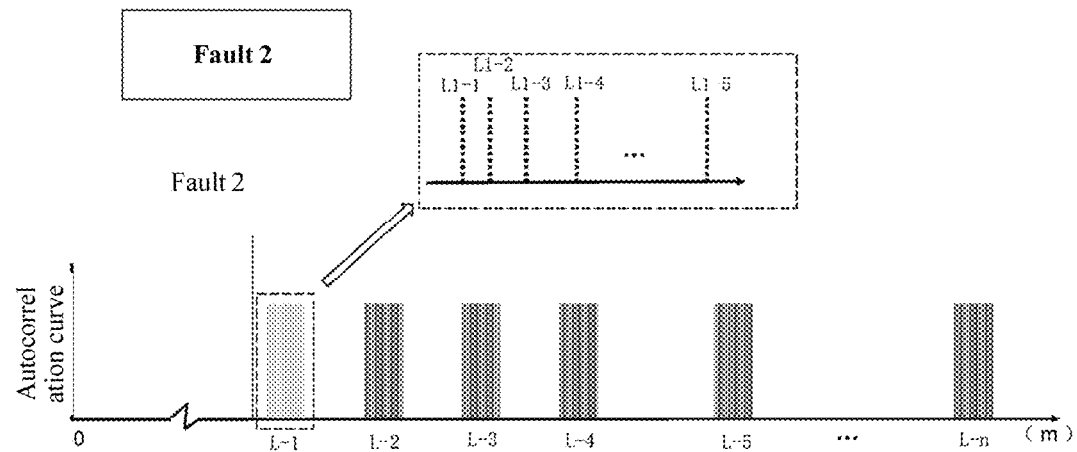
FIG. 5 shows an autocorrelation curve of a control-end isolator-free semiconductor laser 1 when fault 2 in FIG. 2 occurs.

(2) If correlation peaks in only one cluster of the autocorrelation curve of the control-end isolator-free semiconductor laser 1 obtained by the test becomes very small or disappears, and a new correlation peak appears at another position, it indicates that only one stage-1 branch fiber is blocked, and the fault occurs in the stage-1 branch fiber IV, as shown by fault 2 in FIG. 2 and FIG. 5; due to the optical feedback effect, the new reflection peak appears at another position in the autocorrelation curve, and the position of the reflection peak corresponds to the fault position.

Figure 8:
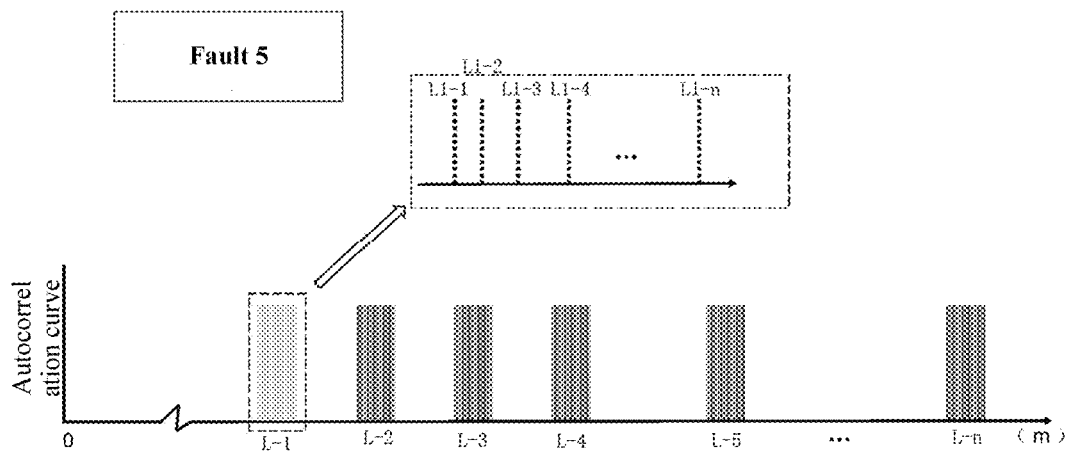
FIG. 8 shows an autocorrelation curve of a control-end isolator-free semiconductor laser 1 when fault 5 in FIG. 2 occurs.
Figure 12:
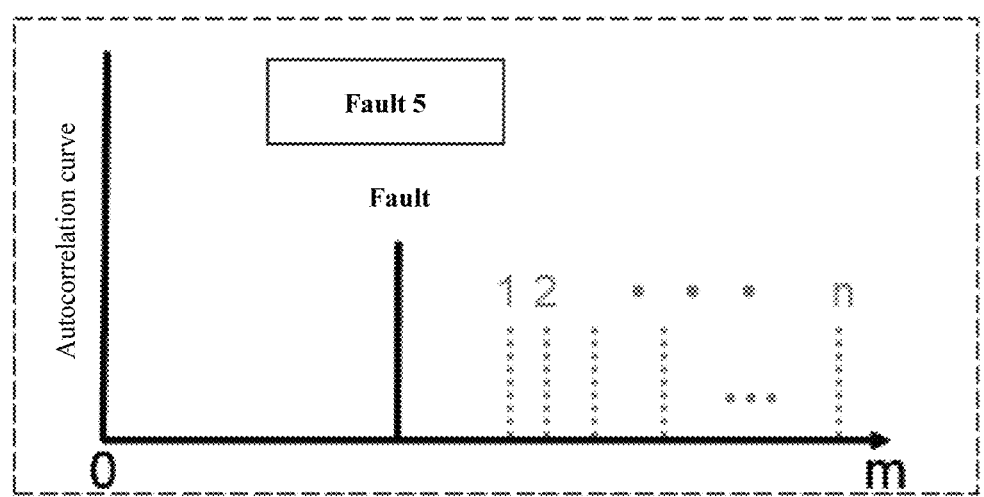
FIG. 12 shows an autocorrelation curve of a user-end isolator-free semiconductor laser 8 when fault 5 in FIG. 2 occurs.

(3) If correlation peaks in only one cluster of the autocorrelation curve of the control-end isolator-free semiconductor laser 1 obtained by the test becomes very small or disappears, and no new correlation peak appears at another position, it indicates that only one stage-1 branch fiber is blocked, and the fault occurs in the fiber of the monitoring system, as shown by fault 5 in FIG. 2 and FIG. 8; in this case, the fault point is located based on the autocorrelation curve obtained by the user-end signal acquisition and processing device 11, as shown in FIG. 12 (for details, see IEEE Photonics Journal. Vol 7. No 6. pp., 2015).

Figure 6:
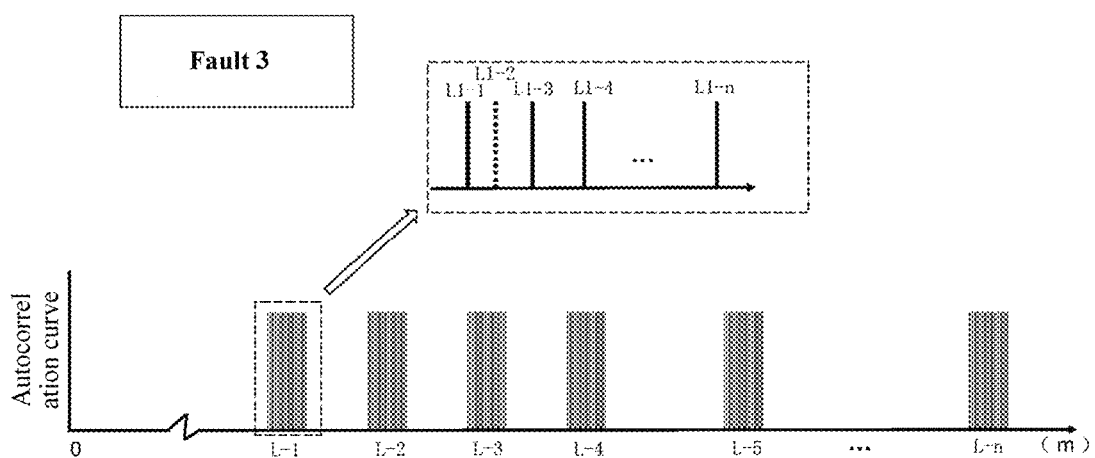
FIG. 6 shows an autocorrelation curve of a control-end isolator-free semiconductor laser 1 when fault 3 in FIG. 2 occurs.
Figure 7:
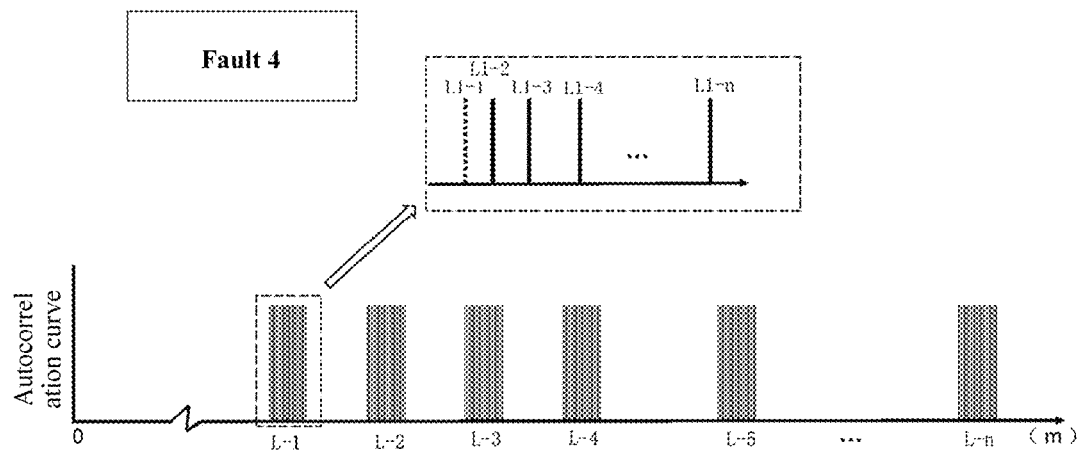
FIG. 7 shows an autocorrelation curve of a control-end isolator-free semiconductor laser 1 when fault 4 in FIG. 2 occurs.
Figure 13:
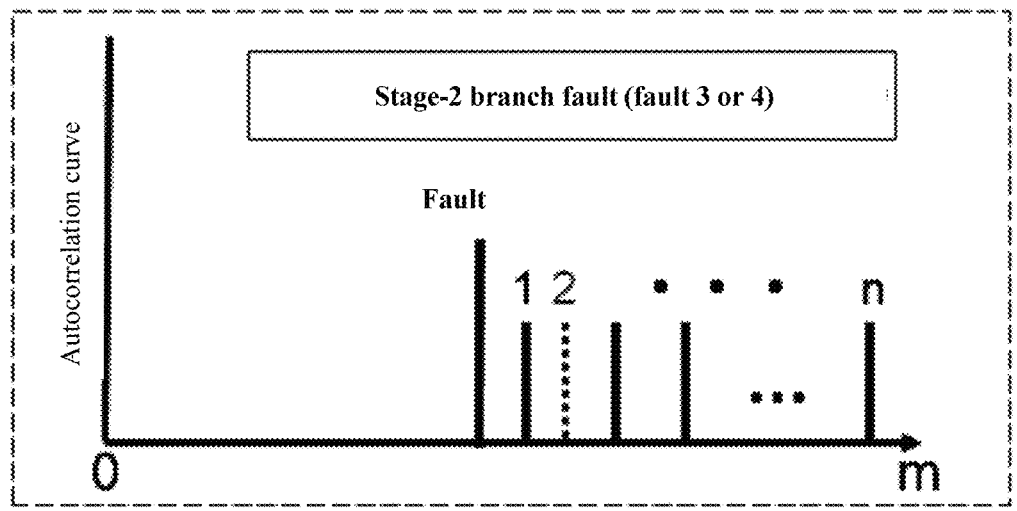
FIG. 13 shows an autocorrelation curve of a user-end isolator-free semiconductor laser 8 when fault 3 or 4 occurs.

(4) If a marked correlation peak in one cluster of the autocorrelation curve of the control-end isolator-free semiconductor laser 1 obtained by the test becomes very small or disappears, and no new peak appears in another position (because light experiences a loss when passing through fibers, and light reflected from a fault point at a stage-2 branch fiber is very small, it is difficult to generate an obvious peak value), the fault occurs in the stage-2 branch fiber VI or a monitoring system of this branch. If the network communication is normal, the fault occurs in the monitoring system, as shown by fault 3 in FIG. 2 and FIG. 6; if the network communication is abnormal, the fault occurs in the stage-2 branch fiber VI, as shown by fault 4 in FIG. 2 and FIG. 7. In this case, the fault point is located based on the autocorrelation curve obtained by the user-end signal acquisition and processing device 11, as shown in FIG. 13 (for details, see IEEE Photonics Journal. Vol 7. No 6. pp., 2015). Then, the user-end isolator-free semiconductor laser 8 reports a monitoring result to the control-end isolator-free semiconductor laser 1 through any normal branch under this branch.

Figure 9:
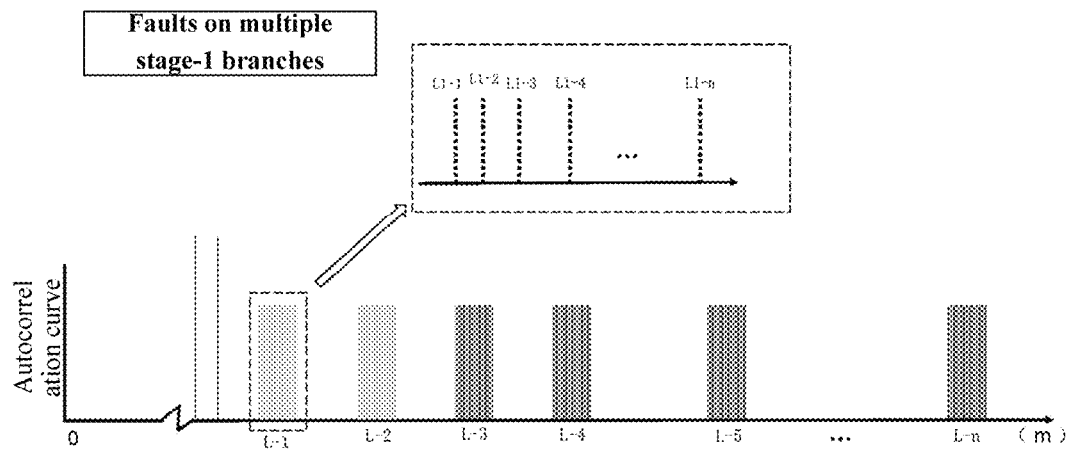
FIG. 9 shows an autocorrelation curve of a control-end isolator-free semiconductor laser 1 when multiple stage-1 branch fibers IV are faulty.

(5) If correlation peaks of multiple clusters become very small or disappear, and correlation peaks of the same quantity appear before the first cluster of correlation peaks, faults occur in multiple stage-1 branch fibers IV, as shown in FIG. 9; in this case, the faulty branches are checked against the marked stage-1 branch fibers IV according to positions of the extra peaks.

Figure 10:
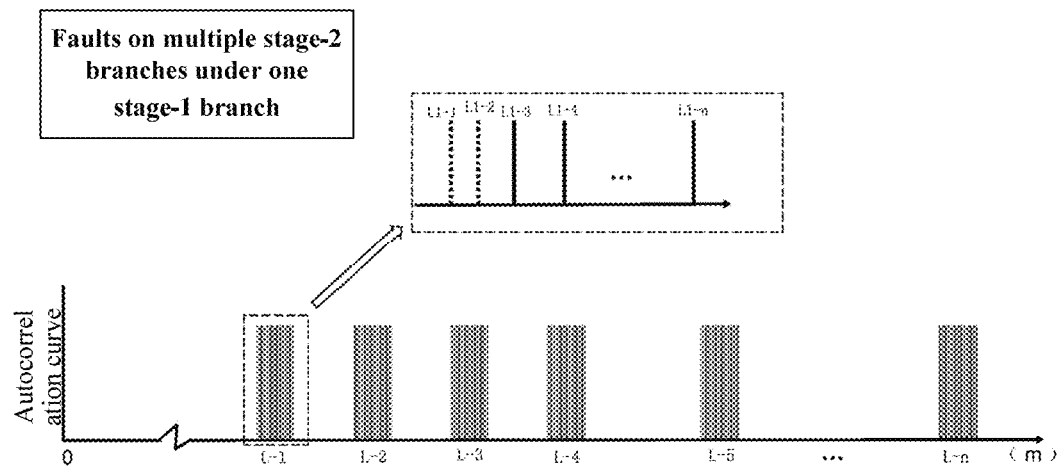
FIG. 10 shows an autocorrelation curve of a control-end isolator-free semiconductor laser 1 when multiple stage-2 branch fibers VI under one stage-1 branch fiber IV are faulty.
Figure 14:
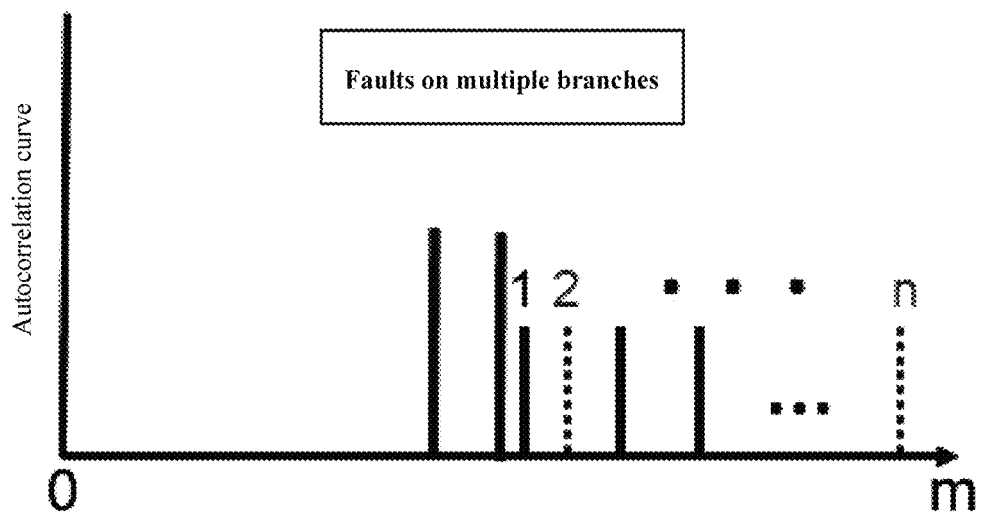
FIG. 14 shows an autocorrelation curve of a user-end isolator-free semiconductor laser 8 when multiple stage-2 branch fibers VI under one stage-1 branch fiber IV are faulty.

(6) If only multiple correlation peaks in the same cluster change, as shown in FIG. 10, faults occur in multiple stage-2 branch fibers VI under one stage-1 branch fiber IV. In this case, the faulty branches are checked against the marked branches according to positions of the extra correlation peaks in the autocorrelation curve obtained by the user-end signal acquisition and processing device 11, as shown in FIG. 14 (for details, see IEEE Photonics Journal. Vol 7. No 6. pp., 2015). Then, the user-end isolator-free semiconductor laser 8 reports a monitoring result to the control-end isolator-free semiconductor laser 1 through any normal branch.

Figure 11:
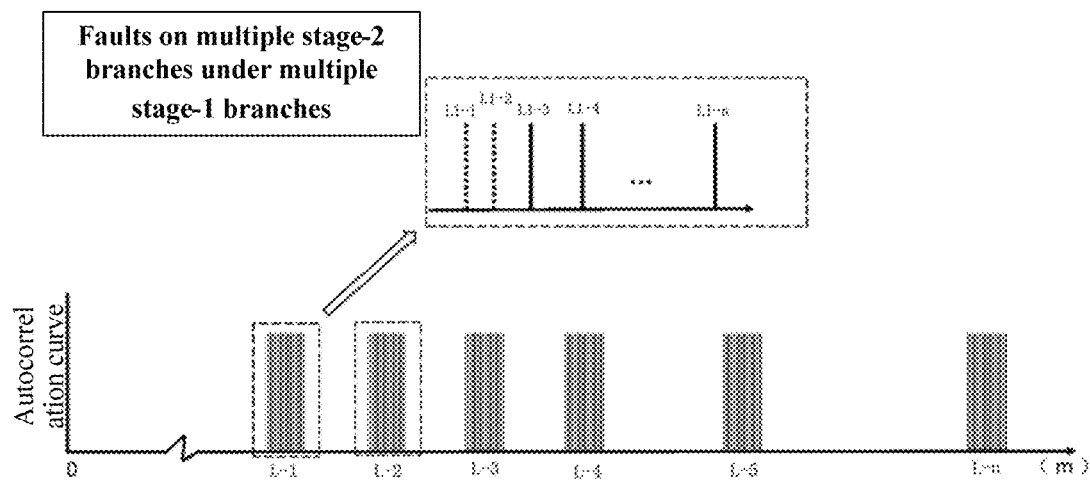
FIG. 11 shows an autocorrelation curve of a control-end isolator-free semiconductor laser 1 when multiple stage-2 branch fibers VI under different stage-1 branch fibers IV are faulty.

(7) If multiple correlation peaks in different clusters change, as shown in FIG. 11, faults occur in multiple stage-2 branch fibers VI under different stage-1 branch fibers IV. In this case, the faulty branches are checked against the marked branches according to positions of the extra correlation peaks in the autocorrelation curve obtained by the user-end signal acquisition and processing device 11. Then, the user-end isolator-free semiconductor laser 8 reports a monitoring result to the control-end isolator-free semiconductor laser 1 through any normal branch.

The claimed scope of the present invention is not limited to the foregoing specific implementations, and the present invention may have a variety of variations and modifications for those skilled in the art. All modifications, improvements and equivalent replacements made within the conception and principles of the present invention shall be included in the protection scope of the present invention.

What is claimed is:

1. A device for monitoring two-stage faults of a TDM-PON with high precision, comprising a two-stage TDM-PON system and a two-stage optical network monitoring system, the two-stage TDM-PON system comprising:
an OLT (I),
a feeder fiber (II),
a stage-1 1:n optical splitter (III),
a plurality of stage-1 branch fibers (IV),
a plurality of stage-2 1:n optical splitters (V),
a plurality of stage-2 branch fibers (VI), and
an optical network unit (ONU) (VII),
wherein the OLT (I) is connected to a common port of the stage-1 1:n optical splitter (III) through the feeder fiber II, a plurality of optical splitting ports of the stage-1 1:n optical splitter (III) are connected to the plurality of stage-2 1:n optical splitters (V) through the plurality of stage-1 branch fibers (IV), and a plurality of optical splitting ports of the plurality of stage-2 1:n optical splitters (V) are in one-to-one connection with the ONU (VII) through the plurality of stage-2 branch fibers (VI);
the two-stage optical network monitoring system comprising:
a control-end isolator-free semiconductor laser (1)
a control-end coupler (2),
a control-end optical coupling device (3),
a control-end photodetector (4),
an integrated signal acquisition and processing device (5),
a plurality of optical coupling devices (6),
a plurality of stage-3 1:n optical splitters (7),
a plurality of user-end isolator-free semiconductor lasers (8),
a plurality of user-end couplers (9),
a plurality of user-end photodetectors (10), and
a plurality of user-end signal acquisition and processing devices (11),
wherein the control-end isolator-free semiconductor laser (1) is connected to the control-end coupler (2); a large-coupling-ratio output end of the control-end coupler (2) is connected to an input end of the control-end optical coupling device (3); a small-coupling-ratio output end of the control-end coupler (2) is connected to an input end of the control-end photodetector (4); the control-end optical coupling device (3) is installed on the feeder fiber II; an output end of the control-end photodetector (4) is connected to an input end of the integrated signal acquisition and processing device (5); the control-end isolator-free semiconductor laser (1), the control-end coupler (2), the control-end optical coupling device (3), the control-end photodetector (4), and the integrated signal acquisition and processing device (5) is located on a first side of the two-stage TDM-PON system, the first side including the OLT (I); the plurality of optical coupling devices (6) are installed on the plurality of stage-2 branch fibers (VI); and the plurality optical coupling devices (6) are located on a second side of the two-stage TDM-PON system, the second side including the ONU (VII),
wherein each user-end isolator-free semiconductor laser (8) is connected to a corresponding user-end coupler (9); a large-coupling-ratio output end of each user-end coupler (9) is connected to a common port of each stage-3 1:n optical splitter (7) through a fiber; a plurality of optical splitting ports of each stage-3 1:n optical splitter (7) are connected to the plurality of optical coupling devices (6) through fibers; a small-coupling-ratio output end of the user-end coupler (9) is connected to an input end of the user-end photodetector (10); the user-end photodetector (10) is connected to the user-end signal acquisition and processing device (11); a distance between the user-end isolator-free semiconductor laser (8) and the control-end isolator-free semiconductor laser (1) varies in each branch, and a minimum difference between adjacent distances is greater than a detection accuracy, ensuring that correlation curves in different clusters do not overlap and that correlation curves in each cluster do not overlap.

2. The device for monitoring two-stage faults of a TDM-PON with high precision according to claim 1, wherein
the control-end isolator-free semiconductor laser (1) and each user-end isolator-free semiconductor laser (8) support a wavelength range of 1600 nm to 1700 nm and an output power of 1 mW to 1 W;
a wavelength difference between the the control-end isolator-free semiconductor laser and each user-end isolator-free semiconductor laser is within 0.5 nm;
the control-end coupler (2) and each user-end coupler (9) are optical couplers with a coupling ratio of 80:20 to 99:1;
the control-end optical coupling device (3) and the plurality of optical coupling devices (6) are wavelength division multiplexers or optical couplers with a coupling ratio of 50:50;
the control-end photodetector (4) and each user-end photodetector (10) are high-speed photodetectors that can respond to signals with a wavelength ranging from 1600 nm to 1700 nm and have a bandwidth of less than 50 GHz; and
the integrated signal acquisition and processing device (5) and each user-end signal acquisition and processing device (11) each comprise a single-channel signal acquisition device with a bandwidth of less than 50 GHz and a digital correlator or computer that can perform autocorrelation calculation.

3. A method for monitoring two-stage faults of a TDM-PON with high precision comprising:
1) after the two-stage TDM-PON system and the two-stage optical network monitoring system are deployed, performing the following steps:
1.1) emitting a laser with a wavelength different from that of a communication signal using a control-end isolator-free semiconductor laser;
passing the laser through a large-coupling-ratio output end of a control-end coupler;
coupling the laser into a feeder fiber through a control-end optical coupling device;
splitting the laser into stage-1 branch fibers through a stage-1 1:n optical splitter;

transmitting the laser into stage-2 1:n optical splitters through stage-1 branch fibers;

transmitting detection light from optical splitting ports of each stage-2 1:n optical splitter to optical coupling devices through stage-2 branch fibers;

coupling the detection light into a stage-3 1:n optical splitter;

transmitting the detection light to a user-end coupler through a fiber;

transmitting the detection light to a user-end isolator-free semiconductor laser; and generating a chaotic laser under the disturbance of optical injection of the control-end isolator-free semiconductor laser using the user-end isolator-free semiconductor laser;

wherein the user-end isolator-free semiconductor laser is configured to:

emit a laser with a wavelength different from that of a communication signal; the laser being output from a large-coupling-ratio output end of a user-end coupler;

transmit the laser to the stage-3 1:n optical splitter through a fiber;

split the laser into the optical coupling devices through fibers;

couple the laser to the stage-2 1:n optical splitters V through the stage-2 branch fibers, couple the laser-to the stage-1 1:n optical splitters through the stage-1 branch fibers, transmit the laser to the control-end optical coupling device through a fiber, then to the control-end coupler, and then to the control-end isolator-free semiconductor laser;

wherein the control-end isolator-free semiconductor laser generates a chaotic laser under the disturbance of optical injection of the user-end isolator-free semiconductor laser;

wherein the two lasers generate chaotic lasers under the disturbance of mutual injection, and the two lasers communicate with each other;

wherein at the control end, the control-end coupler inputs the chaotic laser generated by the control-end isolator-free semiconductor laser to the control-end photodetector through the small-coupling-ratio output end, and the control-end photodetector converts the optical signal into an electrical signal, and then inputs the electrical signal to the acquisition and processing device, so that the acquisition and processing device collects nonlinear signals dynamically output by the control-end isolator-free semiconductor laser, performs autocorrelation calculation, and determines an optical network fault based on the status of the side lobes in an autocorrelation curve;

wherein at the user end, the user-end coupler inputs the chaotic laser generated by the user-end isolator-free semiconductor laser to the user-end photodetector through the small-coupling-ratio output end, and the user-end photodetector converts the optical signal into an electrical signal, and inputs the electrical signal into the user-end signal acquisition and processing device, so that the integrated signal acquisition and processing device collects nonlinear signals dynamically output by the user-end isolator-free semiconductor laser, and performs autocorrelation calculation, to further help the control-end isolator-free semiconductor laser to determine an optical network fault based on the status of correlation peaks in an autocorrelation curve;

1.2) performing autocorrelation calculation on the received electrical signals and obtaining the autocorrelation curves using the integrated signal acquisition and processing device and the user-end signal acquisition and processing device;

1.3) after the two-stage optical network monitoring system is set up, performing a complete measurement on the optical network system when the optical network is in normal communication, wherein there are multiple correlation peaks at different positions except the position of 0 m in the autocorrelation curve; and due to optical injection of the two lasers and different lengths of the stage-2 branch fibers under each stage-1 branch fiber, the correlation peaks appear cluster by cluster, wherein each cluster corresponds to each stage-1 branch fiber, and each correlation peak within a cluster corresponds to each stage-2 branch fiber; marking the correlation peak in the cluster corresponding to each stage-1 branch fiber by turning off a corresponding user-end isolator-free semiconductor laser; marking the correlation peak corresponding to each stage-2 branch fiber of the optical network system by disconnecting a corresponding stage-2 branch fiber, and then starting monitoring while the optical network system is running; and performing a test on the optical network in real time, and comparing a test result with the first marking result to determine a running status of the optical network;

2) after the two-stage TDM-PON system starts running, continuously comparing the autocorrelation curves obtained in steps 1.2) and 1.3), and determining a specific position of a fault according to different phenomena, where:

(1) when correlation peaks of all branches in the autocorrelation curve of the control-end isolator-free semiconductor laser become very small or disappear, and anew correlation peak appears before a first cluster of correlation peaks, it indicates that the fault hinders communication of the entire optical network, and the fault occurs in the feeder fiber; a corresponding fault point as a reflection device has an optical feedback effect on the control-end isolator-free semiconductor laser, and correspondingly, a new peak appears in the autocorrelation curve, and a position of the new peak corresponds to the fault position;

(2) when correlation peaks in only one cluster of the autocorrelation curve of the control-end isolator-free semiconductor laser becomes very small or disappears, and a new correlation peak appears at another position, it indicates that only one stage-1 branch fiber is blocked, and the fault occurs in the stage-1 branch fiber; due to the optical feedback effect, a new reflection peak appears at another position in the autocorrelation curve, and the position of the new reflection peak corresponds to the fault position;

(3) when correlation peaks in only one cluster of the autocorrelation curve of the control-end isolator-free semiconductor laser becomes very small or disappears, and no new correlation peak appears at another position, it indicates that only one stage-1 branch fiber is blocked, and the fault occurs in the fiber of the two-stage optical network monitoring system; and the specific position of the fault is located based on the autocorrelation curve obtained by the user-end signal acquisition and processing device;

(4) when a marked correlation peak in one cluster of the autocorrelation curve of the control-end isolator-free semiconductor laser becomes very small or disappears, and no new peak appears in another position, the fault occurs in the stage-2 branch fiber or a monitoring system of this branch, wherein if the network communication is normal, the fault occurs in the monitoring system; if the network communication is abnormal, the fault occurs in the stage-2 branch fiber; in this case, the fault point is located based on the autocorrelation curve obtained by the user-end signal acquisition and processing device; and then, the user-end isolator-free semiconductor laser reports a monitoring result to the control-end isolator-free semiconductor laser through any normal branch under this branch;

(5) when correlation peaks of multiple clusters become very small or disappear, and correlation peaks of the same quantity appear before the first cluster of correlation peaks, a fault occurs in multiple stage-1 branch fibers; and, the fault is checked against the marked stage-1 branch fibers according to positions of the extra peaks;

(6) when multiple correlation peaks in the same cluster change, a fault occurs in multiple stage-2 branch fibers under one stage-1 branch fiber; the fault is checked against marked branches according to positions of extra correlation peaks in the autocorrelation curve obtained by the user-end signal acquisition and processing device, and the user-end isolator-free semiconductor laser reports a monitoring result to the control-end isolator-free semiconductor laser through any normal branch;

(7) when multiple correlation peaks in different clusters change, a fault occurs in multiple stage-2 branch fibers under different stage-1 branch fibers; the fault is checked against marked branches according to positions of extra correlation peaks in the autocorrelation curve obtained by the user-end signal acquisition and processing device, and the user-end isolator-free semiconductor laser reports a monitoring result to the control-end isolator-free semiconductor laser through any normal branch.

\* \* \* \* \*